United States Patent [19]

Smith

[11] Patent Number: 5,419,212
[45] Date of Patent: May 30, 1995

[54] TOUCHDOWN AND LAUNCH-LOCK APPARATUS FOR MAGNETICALLY SUSPENDED CONTROL MOMENT GYROSCOPE

[75] Inventor: Dennis W. Smith, Phoenix, Ariz.
[73] Assignee: Honeywell Inc., Del.
[21] Appl. No.: 87,240
[22] Filed: Jul. 2, 1993
[51] Int. Cl.$^6$ ............................................. G01C 19/26
[52] U.S. Cl. .................................... 74/5.1; 310/90.5
[58] Field of Search ..................... 74/5.1, 5.12, 5.46; 310/90.5

[56] References Cited

U.S. PATENT DOCUMENTS

| | | | |
|---|---|---|---|
| 3,742,769 | 7/1973 | Crutcher et al. | 74/5 R |
| 3,762,226 | 10/1973 | Davis et al. | 74/5.4 |
| 3,955,858 | 5/1976 | Poubeau | 310/90.5 |
| 4,167,296 | 9/1979 | Dendy | 74/5.46 X |
| 4,211,452 | 7/1980 | Poubeau | 74/5.46 X |
| 4,242,917 | 1/1981 | Bennett et al. | 74/5.5 |
| 4,345,485 | 8/1982 | Livet et al. | 74/5.1 |
| 4,466,299 | 8/1984 | Mross et al. | |
| 4,566,740 | 1/1986 | Beau et al. | 310/90.5 |
| 4,629,261 | 12/1986 | Eiermann et al. | 310/90.5 |
| 4,642,501 | 2/1987 | Kral et al. | 310/90.5 |
| 4,872,357 | 10/1989 | Vaillant De Guelis et al. | 74/5.1 |
| 5,231,323 | 7/1993 | New | 310/90.5 |
| 5,272,403 | 12/1993 | New | 310/90.5 |

FOREIGN PATENT DOCUMENTS 87628 9/1983 European Pat. Off. .

OTHER PUBLICATIONS

J. Schmied & J. C. Pradetto "Behaviour of a One Ton Rotor Being Dropped Into Auxiliary Bearings," 3rd International Symposium on Magnetic Bearings (1992).
R. G. Kirk & T. Ishii, "Transient Rotor Drop Analysis of Rotors Following Magnetic Bearing Power Outage", Virginia Polytechnic Institute and State University (1993).
M. Fumagalli, B. Feeny, G. Schweitzer "Dynamics of Rigid Rotors in Retainer Bearings", 3rd International Symposium on Magnetic Bearings (1992).
Gondhalekar, et al., Proceedings of the 26th Intersociety Energy Conversion Engineering Conference, vol. 4 "Low Noise Spacecraft Altitude Control Systems", Aug. 1991, pp. 244–249.
O'Dea, et al., Proceedings of the 20th Intersociety Energy Conversion Engineering Conference, vol. 2, "Design and Development of a High Efficiency Effector for the Control of Altitude and Power in Space Systems", Aug. 1985, pp. 2353–2360.

Primary Examiner—Rodney H. Bonck
Attorney, Agent, or Firm—Thomas A. Rendos

[57] ABSTRACT

A control moment gyroscope including a rotor extending along a rotor axis. The rotor includes a first and second rotor end. A gimbal housing includes a magnetic suspension system for magnetically suspending the rotor within the gimbal housing to allow rotation of the rotor about the rotor axis. A first and second conical clutch positioned adjacent to the first and second rotor end, respectively, and connected to the gimbal housing couples the rotor to the gimbal housing if the magnetic suspension system is inoperative. The gyroscope also includes an apparatus for forcing the first and second clutches to couple the rotor to the gimbal housing.

6 Claims, 4 Drawing Sheets

TOUCHDOWN AND LAUNCH-LOCK APPARATUS FOR MAGNETICALLY SUSPENDED CONTROL MOMENT GYROSCOPE

FIELD OF THE INVENTION

The present invention relates to magnetically suspended control moment gyroscopes. More particularly, the present invention pertains to an apparatus for providing launch-lock and touchdown functions for a magnetically suspended control moment gyroscope.

BACKGROUND OF THE INVENTION

Control moment gyroscopes provide directional control for a variety of orbiting vehicles, for example, spacecraft. Control moment gyroscopes normally include a motor for spinning the rotor about a rotor axis, a gimbal wherein the rotor is supported or suspended, a gimbal torque motor for rotating the gimbal about a gimbal axis, and a control system. The control moment gyroscope is fixedly mounted to the orbiting vehicle. During operation of the control moment gyroscope with the rotor either mechanically supported by bearings or magnetically suspended within the gimbal, the rotor is spun about the rotor axis at a predetermined rate. The gimbal torque motor rotates the gimbal and spinning rotor about the gimbal axis which is perpendicular to the rotor axis. The rotor is of sufficient mass and is spinning at a rate such that any movement of the rotor outside its plane of rotation will induce a significant torque about an output axis which is normal to both the rotor axis and the gimbal axis. This torque is applied to the orbiting vehicle for providing directional control thereof.

Magnetically suspended rotors within the control moment gyroscopes are utilized to overcome mechanical disturbance problems and short-life problems associated with a mechanically supported rotor. The magnetic suspension system within the control moment gyroscope utilizes various magnetic actuators to levitate the rotor within the gimbal. Any magnetically suspended control moment gyroscope must have a back-up system in case the magnetic suspension system fails. Generally, this back-up system, also referred to as a touchdown system, takes the form of mechanical bearings for supporting the rotor. This touchdown system prevents damage to the various magnetic actuators levitating the rotor and other components in the event of power loss or magnetic suspension system failure by preventing contact between the rotor and the various magnetic actuators.

One common touchdown system consists of a mechanical radial bearing coupled to the gimbal of the control moment gyroscope and through which a shaft member extends from the rotor. Adequate clearance is provided between the shaft and the radial bearing inner diameter to allow for normal function of the magnetic suspension system. Should the magnetic suspension system fail to operate, the shaft contacts the inner diameter of the radial bearing before the rotor contacts the magnetic actuators, thus preventing damage to the magnetic actuators. An axial thrust bearing is added to the radial bearing to prevent excess axial excursions.

In addition to a touchdown system for preventing damage to the magnetic actuators in the event of an inoperative magnetic suspension system, a launch-lock system is necessary during launch of an orbiting vehicle. When the magnetic suspension system is not energized during launch, normal operating clearances provide an unacceptable opportunity for the magnetically suspended rotor within the gimbal to move or rattle about therein. Allowing the rotor to move or rattle about within the control moment gyroscope leads to high-impact loads thereon and damage thereto during launch vibration. In addition, if the magnetic suspension system failed during operation, the rotor would be free to move or rattle about within the control moment gyroscope for the remainder of the mission of the orbiting vehicle. Such movement and rattling about causes significant shock and vibration whenever the orbiting vehicle moves. Therefore, in addition to a touchdown system for preventing damage to magnetic actuators in the event of power loss or other magnetic suspension system failures, a launch-lock system is required to support the rotor during launch and during operation if the magnetic suspension system fails.

Most mechanically supported control moment gyroscopes take the launch vibration loads through bearings supporting the spinning rotor and therefore do not require a separate launch-lock system. When launch-lock systems are used, they usually take the form of a device that clamps hardware to a structural member by means of an actuator. Common actuators used for such clamping function include pyrotechnics, paraffin actuators, solenoids, and motors. Such common launch-lock techniques would be heavy and complex when utilized with a magnetically suspended control moment gyroscope wherein the rotor is quite massive in order to provide a large torque output.

A need is present for innovative touchdown systems and launch-lock systems in order to save weight and complexity. In addition, a system for integrating the touchdown system and the launch-lock system for saving weight and complexity within the control moment gyroscope is apparent.

SUMMARY OF THE INVENTION

The present invention is directed to a magnetically suspended control moment gyroscope. The control moment gyroscope includes a rotor extending along a rotor axis. The rotor has a first and second rotor end. A gimbal housing including a magnetic suspension system suspends the rotor within the gimbal housing to allow rotation of the rotor about the rotor axis. A first and second clutch positioned adjacent the first and second rotor end, respectively, and connected to the gimbal housing couples the rotor to the gimbal housing if the magnetic suspension system is inoperative.. The control moment gyroscope further includes an apparatus for forcing the coupling of the rotor to the gimbal housing.

In one embodiment of the invention, each of the first and second clutches include a male conical surface coupled to the gimbal housing by bearings providing backup support for the rotor. Each of the male conical surfaces is sized for mating a female conical surface at the first and second end of the rotor, respectively.

In another embodiment of the invention, one of the clutches includes a bearing-cone assembly movably mounted to the gimbal housing and the other clutch includes a bearing-cone assembly fixedly mounted to the gimbal housing. The apparatus for forcing the coupling of the rotor to the gimbal housing includes an axial actuator for moving the movably mounted bearing-cone assembly along the rotor axis to force such coupling.

In yet another embodiment of the invention, the control moment gyroscope includes a rotor extending along a rotor axis. The rotor has a first and second rotor conical surface at a first and second rotor end thereof, respectively, coaxial with the rotor axis. A gimbal housing includes a magnetic suspension system for magnetically suspending the rotor therein to allow rotation of the rotor about the rotor axis. The gyroscope also includes first and second conical mating surfaces sized to mate with the first and second rotor conical surfaces, respectively. Bearings coupled to the gimbal housing support each of the conical mating surfaces so as to define a gap between the first and second rotor conical surfaces and the first and second conical mating surfaces, respectively, when the magnetic suspension system is operative allowing rotation of the rotor about the rotor axis. The bearings allow for rotation of the rotor and the conical mating surfaces supported by the bearings when the gap is eliminated by contact of the first and second rotor conical surfaces with the first and second conical mating surfaces, respectively.

DETAILED DESCRIPTION OF THE PREFERRED EMBODIMENT

Figure 1:
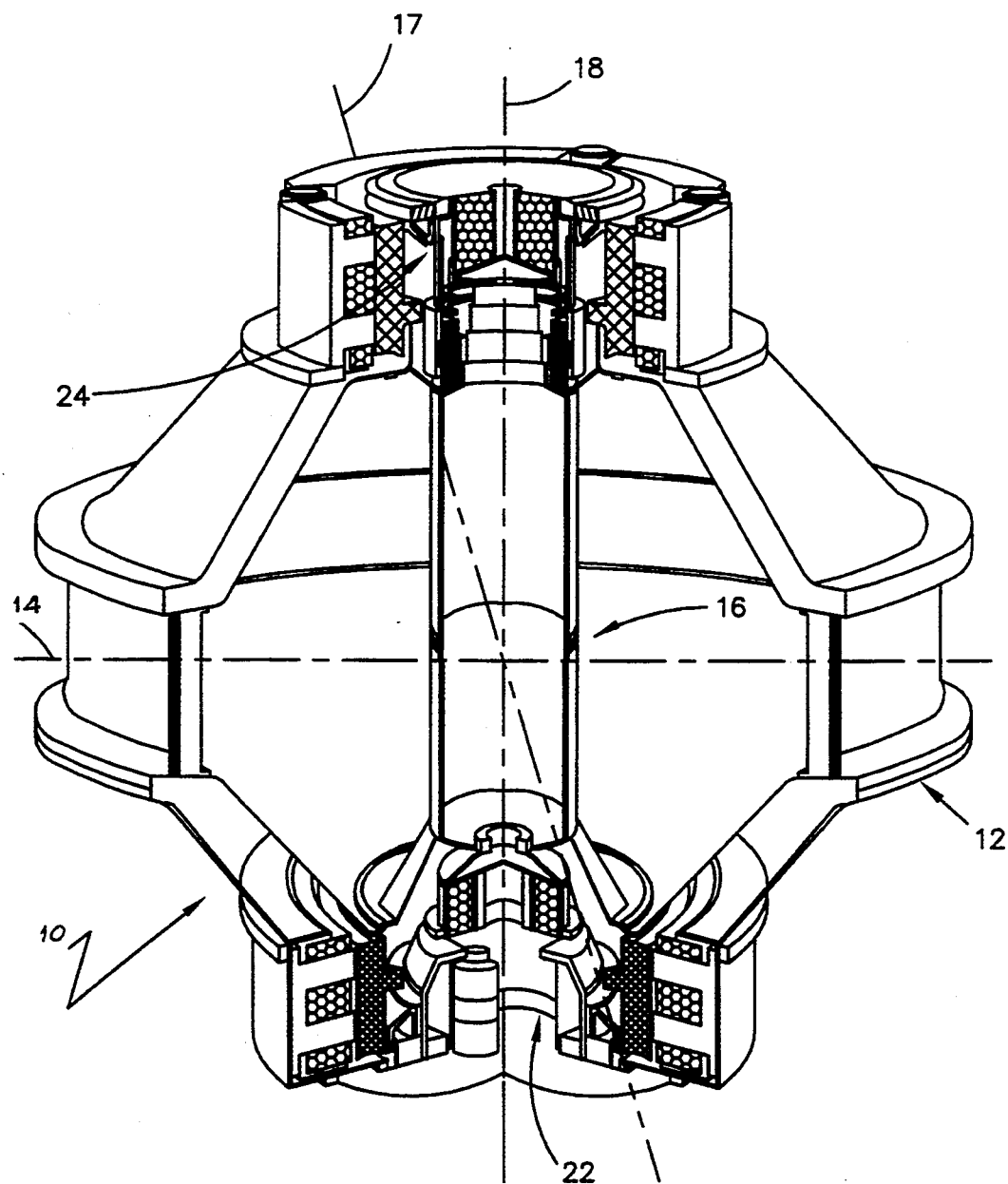
FIG. 1 shows a perspective view in partial cross-section of a control moment gyroscope in accordance with the present invention.

With reference to FIGS. 1–5, control moment gyroscope 10 with touchdown and launch-lock system shall be described in accordance with the present invention. The control moment gyroscope 10 includes rotor 16 magnetically suspended within gimbal housing 12 for rotation about rotor axis 18. A gimbal torque motor (not shown) is directly attached to gimbal housing 12. A gimbal housing support frame (not shown) extends from the gimbal torque motor such that the gimbal housing 12 can rotate about gimbal axis 14. During operation of the control moment gyroscope 10, the rotor 16 is spun about rotor axis 18 at a predetermined rate. The rotor 16 is of sufficient mass and is spinning at such a rate that any movement of the rotor 16 out of its plane of rotation induces a significant torque about output axis 17, which is both normal to the rotor axis 18 and gimbal axis 14. Torque about the output axis 17 is transferred to the orbiting vehicle to which the control moment gyroscope 10 is mounted.

Figure 2:
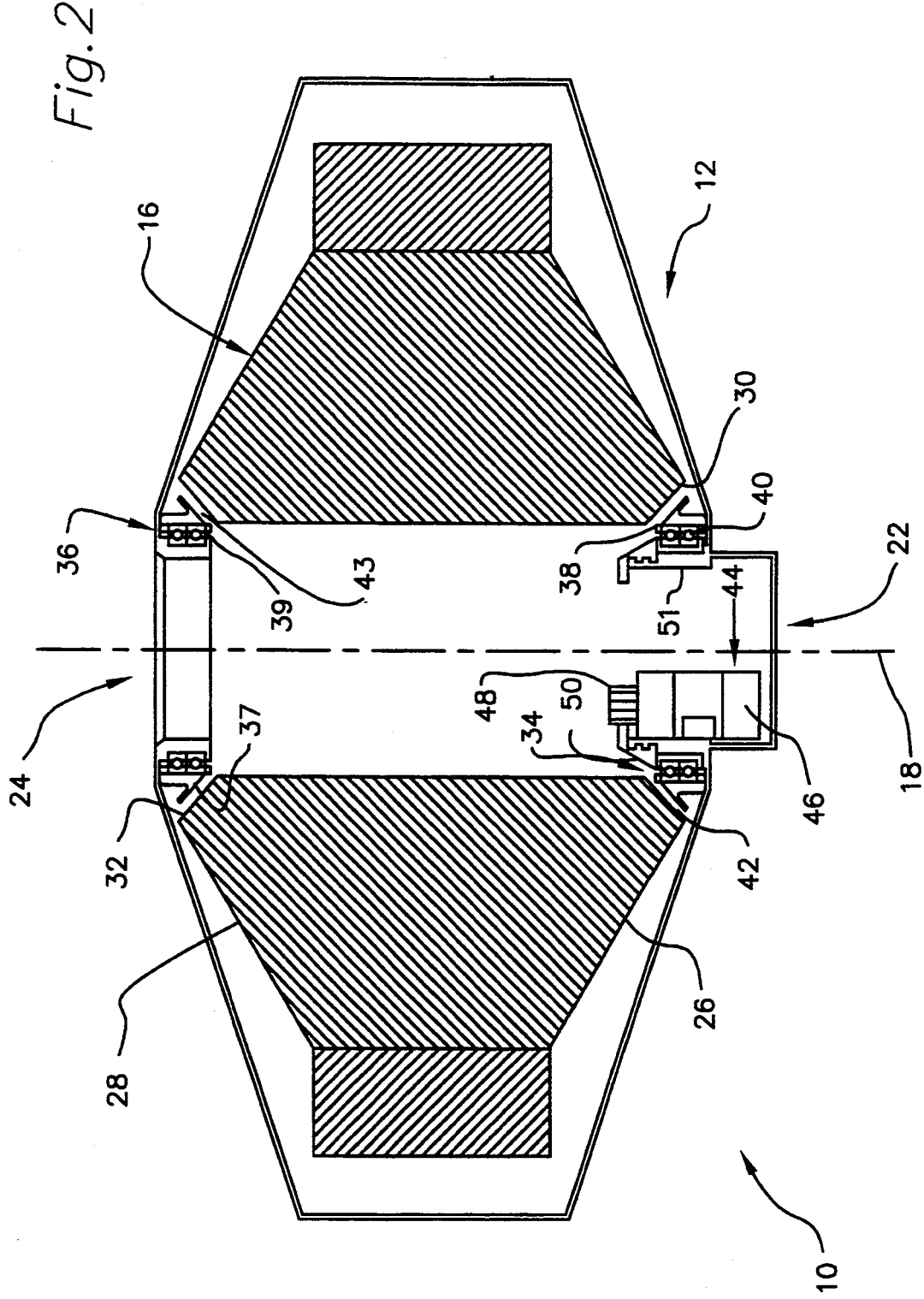
FIG. 2 is a simplified cross-sectional view of the control moment gyroscope of FIG. 1 in accordance with the present invention.

To provide touchdown and launch-lock functions for the magnetically suspended control moment gyroscope 10, the control moment gyroscope 10 further includes a fixedly mounted conical clutch 24 and a movably mounted conical clutch 22. As shown in FIG. 2, movably mounted conical clutch 22 includes a movably mounted bearing-cone assembly 34. The movably mounted bearing-cone assembly 34 includes a first touchdown mating surface 38 being of a male conical configuration sized for mating with a first rotor touchdown surface 30 at a first rotor end 26 of rotor 16; the first rotor touchdown surface 30 being of a female conical configuration positioned coaxial with and at a radial distance from the rotor axis 18. The first touchdown mating surface 38 is supported by bearings 40 of the bearing-cone assembly 34 and are movably coupled to gimbal housing 12. The movably mounted conical clutch 22 further includes a motor driven threaded actuator 44 for movably mounting the first touchdown mating surface 38 and bearings 40 to gimbal housing 12. The movably mounted conical clutch 22 allows the touchdown mating surface 38 and bearings 40 to be translated axially along rotor axis 18.

Fixedly mounted conical clutch 24 on the opposite end of gimbal housing 12 includes bearing-cone assembly 36. Bearing-cone assembly 36 includes a second touchdown mating surface 37 being of a male conical configuration sized for mating with a second rotor touchdown surface 32 positioned at a radial distance from and coaxial with rotor axis 18 at a second rotor end 28; the second rotor touchdown surface 32 being of a female conical configuration. The second touchdown mating surface 37 is supported by bearings 39 which are fixedly mounted to gimbal housing 12.

Figure 3:
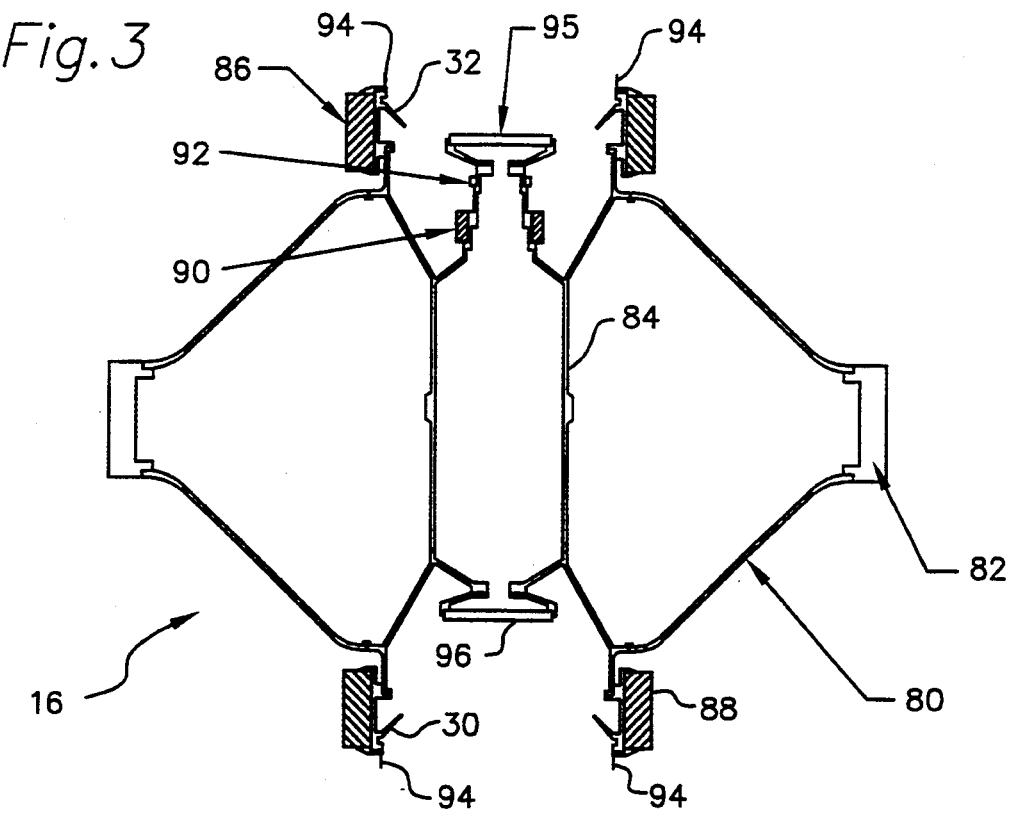
FIG. 3 is a cross-section of a rotor of the control moment gyroscope of FIG. 1.

FIG. 3 shows a cross-section of rotor 16. Rotor shell 80 mechanically supports all the components of rotor 16. A rotor shell rim 82 of rotor 16 encircles rotor shell 80 and supplies the majority of the mass for the rotor 16 to provide the majority of rotor angular momentum. The rim 82 is of sufficient size and density so as to provide sufficient momentum for making a directional change of an orbiting vehicle while the rotor 16 is spinning at a predetermined rate. Also attached to the rotor shell 80 is the rotor shaft 84 which connects the sides of the rotor shell 80. Armatures 86 and 88, motor rotor 90, and resolver rotor 92 encircle the rotor shaft 84 and are all made of magnetically permeable material through which a magnetic field generated by various actuators act. The upper and lower translational magnetic armatures 95,96, respectively, are mounted at opposite ends of the rotor shaft 84 and are also constructed of magnetic permeable material. The first and second rotor touchdown surfaces 30,32 of a female conical configuration are positioned at a predetermined distance from and coaxial with rotor axis 18 and connected to the rotor shell 80. Gap sensor surfaces 94 extend outward from rotor shell 80 and are utilized by gap sensor 98 of gimbal housing 12.

Figure 4:
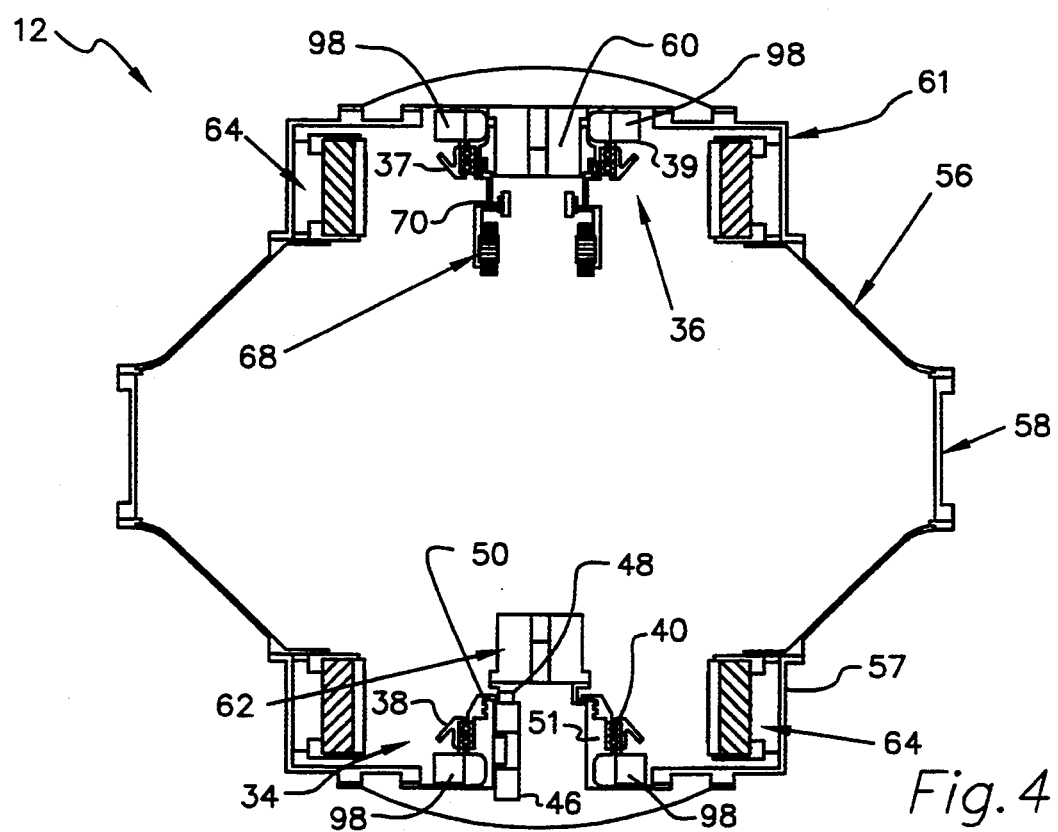
FIG. 4 is a cross-section of a gimbal housing of the control moment gyroscope of FIG. 1.

FIG. 4 shows a cross-section of gimbal housing 12 in which rotor 16 is positioned. Gimbal housing 12 includes gimbal shell 56 for supporting a magnetic actuation system thereof which magnetically suspends rotor 16 therein when the magnetic suspension system is operative. The gimbal shell 56 is encircled by gimbal housing ring 58 sized to correspond with rotor shell rim 82. Translational actuator 60 is positioned at a first end of the gimbal shell 56 and at a second end of the gimbal shell 56 is positioned translational actuator 62. The translational actuators 62, 60 create a magnetic field which acts to provide suspension support for the rotor along the rotor axis 18. Also located at the first and second end of the gimbal shell 56 are actuators 64 which provide rotor suspension and gyroscope torque generation. The actuators 64 are housed and supported within actuator housing 57 and 61, connected to gimbal shell 56. Motor stator 68 and resolver stator 70, components of the DC brushless motor which induce a spin on the rotor 16 about the rotor axis 18, are also positioned at the first end of gimbal shell 56. Fixedly mounted to gimbal housing 12 at the first end of the gimbal housing shell 56 is bearing-cone assembly 36 and at the second end of the shell 56 bearing cone assembly 34 is movably mounted to gimbal housing 12. Gap sensors 98 function with gap sensor surfaces 94 of rotor 16 to measure displacement of the rotor 16 relative to the various actuators of gimbal housing 12 for feedback to a rotor position control.

Figure 5:
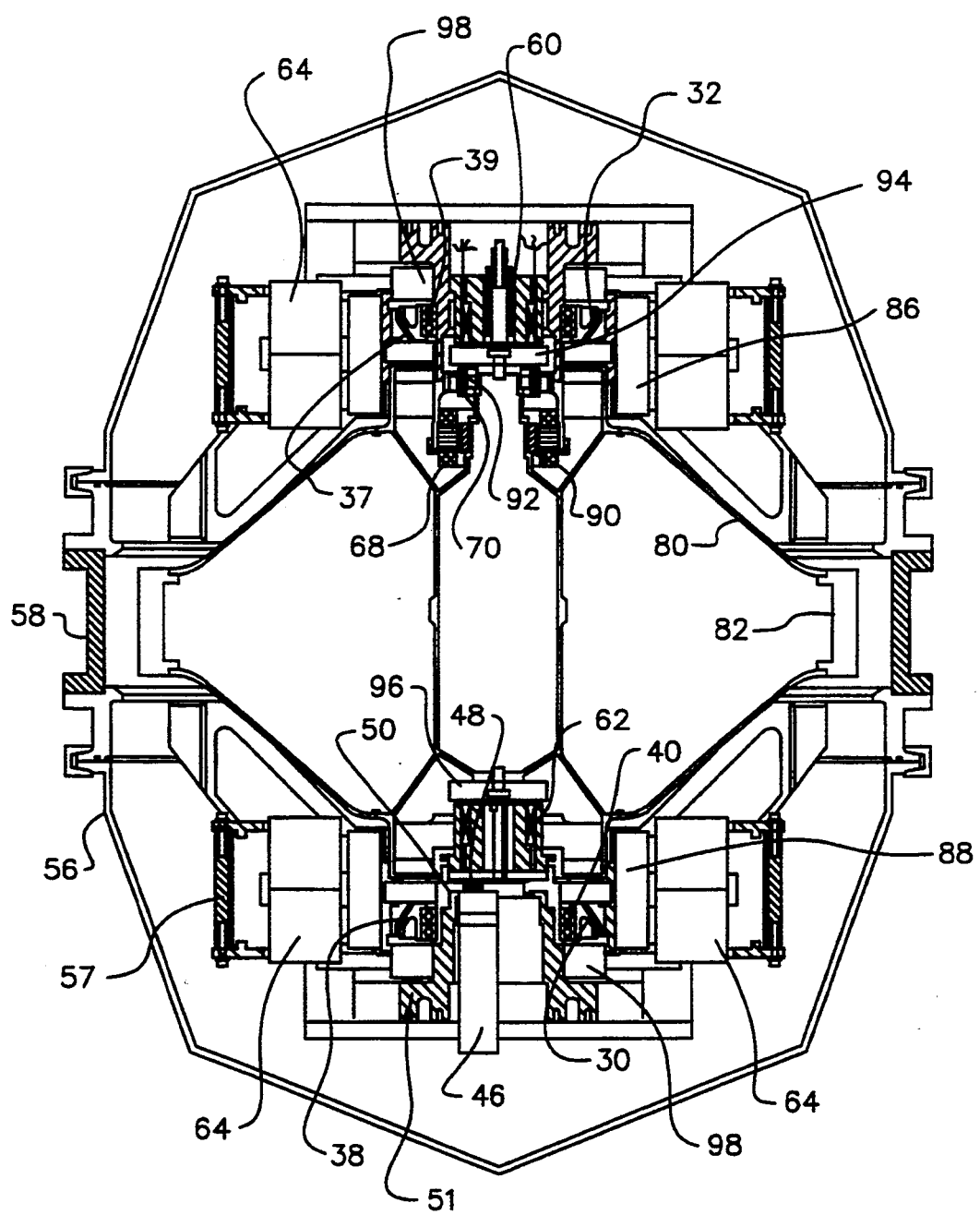
FIG. 5 is a cross-section of an assembled rotor and gimbal housing of the control moment gyroscope of FIG. 1.

As shown in the assembled control moment gyroscope 10, FIG. 5, actuators 64 form a ring around armature 86 and around armature 88. The armatures 86,88 are aligned to rotate within the rings created by the actuators 64. The motor rotor 90 is aligned with the motor stator 68 and the resolver rotor 92 is aligned with the resolver stator 70. The translational magnetic armatures 94, 96 are aligned with the translational actuators 60,62, respectively.

The operation of the various magnetic actuators can be best understood by study of U.S. Pat. No. 4,642,501 to Kral, et al., entirely incorporated herein by reference thereto. In the control moment gyroscope 10, the translational actuators 60,62, and actuators 64 create a magnetic field which suspends the rotor assembly along the rotor axis 18 so that the rotor 16 does not contact the interior of gimbal housing 12. The brushless DC motor spins the rotor 16 inside the gimbal housing 12 about the rotor axis 18. The gap sensors 98 in conjunction with gap sensor surfaces 94 constantly monitor the position of the rotor 16. If the rotor 16 begins to drift towards any of the interior surfaces of the gimbal housing 12, the gap sensors 98 will detect this and the various magnetic actuators will compensate by varying the field strength.

In normal operation, rotor 16 is suspended by the magnetic field generated by the various actuators. When suspended, a gap 42, FIG. 2, exists between first male conical touchdown mating surface 38 and first female conical touchdown surface 30 and a gap 43 exists between second male conical touchdown mating surface 37 and second female conical touchdown surface 32. The gaps 42, 43 are sufficient to allow the rotor 16 to move and rotate within the operational range of the magnetic suspension system of gimbal housing 12. If the magnetic suspension system fails or loads are applied to it that are beyond its capacity, the rotor 16 will traverse the gaps 42, 43 and the first and second touchdown mating surfaces 38, 37 will contact first and second touchdown surfaces 30,32, respectively. When contact occurs providing the touchdown function, the first and second touchdown mating surfaces 38,37 that are supported by bearings 40,39, respectively, are accelerated to the speed of the rotor 16 and provide support of the rotor 16 such that contact between the rotor 16 and the various actuators is prevented.

The rate of acceleration is dependent on the drag torque of the bearings 40,39, the mass inertia of the bearing-cone assemblies 36,34, the friction coefficient between the first and second touchdown mating surfaces 38,37 and the first and second touchdown surfaces 30,32, respectively, and the contact force thereof. Between the time that initial contact of the first and second touchdown mating surfaces 38,37 with the first and second touchdown surfaces 30,32 is made and the time that the surfaces and bearings are at the same speed as the rotor 16, sliding occurs between the surfaces. Such sliding produces wear on the surfaces. One of the effects of wear is that the static or dynamic balance of the rotor 16 may be affected by the removal of material from or the addition of material to the first and second touchdown surfaces 30,32 of rotor 16. In addition, excess wear produces debris that must be contained.

To reduce wear such that a minimum rotor weight change and minimum debris is generated during an occurrence of a touchdown or contact between first and second rotor touchdown surfaces 30, 32 and first and second touchdown mating surfaces 38,37, respectively, certain materials for the surfaces are selected. The first and second rotor touchdown surfaces 30, 32 may include the material titanium nitride coated 440C when the first and second touchdown mating surfaces, 38,37 are of bare 440C or rotor touchdown surfaces 30,32 may be of Nitronic 60 when touchdown mating surfaces 38,37 are of bare 440C. Other combinations of surface materials may be adequate and the present invention is not limited to those listed.

The angle of the conical surfaces of the first and second rotor touchdown surfaces 30,32 and first and second mating surfaces 38,37 are selected based on clearance requirements for the various actuators. The amount of force required to disengage and engage the launch-lock system, to be described further below, are two particular considerations when selecting such angles.

Bearings 40,39 are duplexed pairs of angular contact ball bearings. The bearings utilized include large thin-section bearings to provide adequate load capacity. Silicone nitride (SiN) balls are utilized because of their low mass to minimize skidding during acceleration of the touchdown mating surfaces 37,38. Other bearing types, such as tapered and spherical rolling bearings may be utilized; the present invention not being limited to those listed. Rheolube 2000 grease is utilized for the lubricant because of its low vapor pressure and low drag torque, although other lubricants may be adequate.

As described above, the movably mounted conical clutch 22 and fixedly mounted clutch 24 perform the touchdown function preventing contact of the rotor 16 with the various actuators should the magnetic suspension system of the gimbal housing 12 fail or loads are applied which are beyond its capacity. In addition to serving the touchdown function, the fixedly mounted conical clutch 24 and movably mounted conical clutch 22 perform a launch-lock feature during launch and other times when the magnetic suspension system is inoperative for some period of time. The conical clutch 24 including bearing-cone assembly 36 is solidly mounted to the gimbal housing 12 with the bearing 39 coupling the touchdown mating surface 37 thereto. The movably mounted bearing-cone assembly 34 of conical clutch 22 is mounted to a shaft-like member 51 of gimbal housing 12. The movably mounted bearing-cone assembly 34 can then be translated axially by motor driven threaded actuator 44 until the rotor 16 is captured between the fixedly mounted bearing-cone assembly 36 and movably mounted bearing-cone assembly 34. The rotor 16 is then allowed to rotate about rotor axis 16 being supported through bearings 40,39 of gimbal housing 12.

The axial actuation to move the movably mounted bearing-cone assembly 34 axially along rotor axis 18 is accomplished by motor driven threaded actuator 44. However, the present invention is not limited to such means of axial actuation as others may adequately perform this function such as an electromagnetic linear actuator, hydraulic or pneumatic actuator, parrafin linear actuator, or a memory metal actuator. The motor driven threaded actuator 44 consists of multi-pass gear drive motor 46 driving a planetary gear 48. The inboard end of the movably mounted bearing-cone assembly 34 interfaces with shaft-like member 51 of the gimbal housing 12 through threaded surfaces 50. As the motor 46 turns the planetary gear 48, the bearing-cone assembly 34 is moved along the rotor axis 18 by the threaded surfaces 50 to provide the launch-lock function when desired.

The touchdown system is designed to function with the launch-lock system completely disengaged. The launch-lock system is, therefore, functionally independent of the touchdown system and thus devoid of time constraints. The motor 46 is selected on the basis of output torque required to translate the movably mounted bearing-cone assembly 34 axially with the rotor 16 in any orientation. In a gravity field, resisting this translation is the weight of the rotor 16 acting through the friction in the motor driven threaded actuator 44 and the interface between the first and second touchdown mating surfaces 38,37 and first and second touchdown surfaces 30,32. The locking of the rotor during launch or when the magnetic suspension system fails prevents the rotor 16 from moving or rattling about within the gimbal housing preventing high-impact loads thereon and damage thereto. By combining the apparatus for the touchdown function with the apparatus for the launch-lock function, weight and complexity is also reduced.

Those skilled in the art will recognize that only preferred embodiments of the present invention have been disclosed herein, that other advantages may be found and realized, and that various modifications may be suggested by those versed in the art. It should be understood that the embodiment shown herein may be altered and modified without departing from the true spirit and scope of the invention as defined in the accompanying claims.

What is claimed is:

1. A control moment gyroscope, comprising:
   a rotor extending along a rotor axis, said rotor having first and second rotor touchdown surfaces at first and second ends thereof, respectively;
   a gimbal housing including means for magnetically suspending said rotor therein to allow rotation of said rotor about said rotor axis;
   first and second touchdown mating surfaces to mate with said first and second rotor touchdown surfaces, respectively, at least one of said first and second touchdown mating surfaces being movably mounted to said gimbal housing;
   bearing means coupled to said gimbal housing to support each of said touchdown mating surfaces so as to define a gap between said first and second touchdown surfaces and said first and second touchdown mating surfaces, respectively, when said magnetic suspension means is operative allowing for rotation of said rotor about said rotor axis, said bearing means allowing said rotor and said touchdown mating surfaces supported thereby to rotate when said gap is eliminated by contact of said first and second rotor touchdown surfaces with said first and second touchdown mating surfaces, respectively; and
   a motor driven actuator for translating axially said at least one movably mounted touchdown mating surface along said rotor axis to force said first and second rotor touchdown surfaces into contact with said first and second touchdown mating surfaces eliminating said gap, such that said bearing means supports said first and second touchdown mating surfaces allowing said rotor to rotate about said rotor axis.

2. A gyroscope according to claim 1, wherein said first and second rotor touchdown surfaces include first and second conical surfaces, respectively, coaxial with said rotor axis at said first and second end of said rotor, respectively, and wherein said first and second touchdown mating surfaces include third and fourth conical surfaces sized to mate with said first and second conical surfaces, respectively.

3. A gyroscope according to claim 2, wherein said first and second conical surfaces include female conical surfaces and said third and fourth conical surfaces include male conical surfaces for mating with said first and second female conical surfaces, respectively.

4. A gyroscope according to claim 2, wherein said bearing means include duplexed pairs of angular contact ball bearings.

5. A gyroscope according to claim 1, wherein said first and second rotor touchdown surfaces include first and second female conical mating surfaces, respectively, coaxial with said rotor axis and wherein said first and second touchdown mating surfaces include first and second male conical mating surfaces, respectively, sized to mate with said first and second female conical mating surfaces, respectively.

6. An apparatus according to claim 5, wherein said motor driven actuator is a motor driven threaded actuator.

* * * * *